United States Patent [19]

Kaufman et al.

[11] 4,245,300
[45] Jan. 13, 1981

[54] INTEGRATED AND DISTRIBUTED INPUT/OUTPUT SYSTEM FOR A COMPUTER

[75] Inventors: Phillip A. Kaufman, Saratoga; Jerry R. Washburn, Mission Viejo, both of Calif.

[73] Assignee: Computer Automation, Irvine, Calif.

[21] Appl. No.: 912,852

[22] Filed: Jun. 5, 1978

[51] Int. Cl.³ .............................................. G06F 3/00
[52] U.S. Cl. .................................................. 364/200
[58] Field of Search ... 364/200 MS File, 900 MS File, 364/200, 900

[56] References Cited

U.S. PATENT DOCUMENTS

| Re. 26,832 | 3/1970 | Randlev | 364/200 |
|---|---|---|---|
| 3,239,819 | 3/1966 | Masters | 364/200 |
| 3,766,526 | 10/1973 | Buchanan | 364/200 |
| 4,041,473 | 8/1977 | Bardotti et al. | 364/200 |
| 4,073,005 | 2/1978 | Parkin | 364/200 |
| 4,075,691 | 2/1978 | Davis et al. | 364/200 |
| 4,093,981 | 6/1978 | McAllister et al. | 364/200 |

OTHER PUBLICATIONS

PDP-11 Processor Handbook, Digital Equipment Corporation, 1973, pp. 2-1, 2-9 to 2-12.

*Primary Examiner*—Raulfe B. Zache
*Attorney, Agent, or Firm*—Knobbe, Martens, Olson, Hubbard & Bear

[57] ABSTRACT

The input/output system for a computer of this invention permits a peripheral device and its associated peripheral processor to be connected either (a) directly to the central processor unit of the computer, or (b) to a remote hardware peripheral control device which permits the central processor unit to directly control the peripheral processor, or (c) to a remote input/output controller which controls the peripheral processor independently of the central processor unit of the computer. The input/output system of this invention permits the use of the same software set stored in memory to control the input/output operations of a selected peripheral device regardless of where the peripheral device is connected.

16 Claims, 9 Drawing Figures

INTEGRATED AND DISTRIBUTED INPUT/OUTPUT SYSTEM FOR A COMPUTER

BACKGROUND OF THE INVENTION

The prior art has taught that, in relatively simple systems, a peripheral device, such as a teletype, could be controlled by direct connection of the peripheral device to the central processor unit of a computer system. In such cases, the central processor unit must have sufficient control logic and sufficient storage capability for firmware instructions to be capable of handling data to be transferred from or to the peripheral device. Typically, such a data transfer is made by the central processor unit between the main computer memory and the peripheral or an associated peripheral processor. One disadvantage of such an input/output system is that the main line programming operations of the central processor unit must be interrupted in order to effect a data transfer between the peripheral device and the main memory. Another disadvantage is that a portion of the control storage capability of the central processor unit must be dedicated to storing instructions which enable the central processor unit to select one peripheral device from among the plurality of peripheral devices connected directly to the central processor unit for the input or output of data. Another disadvantage of this type of input/output system is that the size of the central processor unit physically restricts the number of peripheral devices which may be connected directly to the central processor unit in a practical manner.

The prior art taught that the physical restriction as to the number of peripheral devices connected to the central processor unit and the proximity of these peripheral devices to the central processor in such simple systems may be eliminated by the use of an input/output bus which connects to remote input/output controllers at various points along the input/output bus. Each input/output controller, acting as a multiplexer, selects from among a plurality of peripheral devices connected directly to the remote input/output controller. Such a remote input/output controller eliminates the necessity of the central processor unit performing the selection or priority function.

A further improvement in this concept has been made by providing remote peripheral device controllers having firmware control logic which manage the input or output of data to the peripheral controllers independently of the central processor unit. With the advent of the input/output bus and the use of remote peripheral device controllers having a plurality of peripheral devices connected directly to each controller, the prior art abandoned the concept of connecting peripheral devices directly to a central processor unit. This eliminated the need for the central processor unit firmware to store instructions necessary to perform the selection function. It also eliminated the need for direct peripheral control capability within the central processor unit. Thus, the central processor unit firmware storage stored only those instructions which were necessary to control the input or output of data from a peripheral device connected to a hardware input/output controller.

The hardware remote input/output controller devices which permit the control of the input/output operations by the central processor unit are fully described in U.S. Patent Application Ser. No. 647,762, Filed Jan. 9, 1976, by Phillip A. Kaufman and Jerry R. Washburn, issued July 11, 1978 as U.S. Pat. No. 4,100,601, entitled "Multiplexer For A Distributed Input/Output Controller", and assigned to the assignee on the present invention. The disclosure of that application is incorporated herein by reference. The remote input/output controllers having direct memory access and firmware capability for managing the input/output operations from peripheral devices independently of the central processor unit are fully described in U.S. patent application Ser. No. 35,263, filed May 1, 1979, by Phillip Kaufman, Jerry R. Washburn, and Paul A. Stapinski entitled "Distributed Input/Output Controller System", and assigned to the assignee of this application. The disclosure of that application is incorporated herein by reference.

The prior art has taught the use of a software system stored in memory and firmware instructions stored within the central processor unit for handling the input/output operations performed by remote controllers. The prior art, however, did not recognize that a combination of the distributed input/output system with a direct connection of a plurality of peripheral devices to the central processor unit was advantageous. Furthermore, the prior art did not recognize that the same software stored in memory to manage the distributed input/output system could be used to manage the input/output operations of the peripheral devices connected directly to the central processor unit. Thus, the prior art taught that the use of a distributed input/output system comprising the remote controllers and the input/output bus eliminated any desirability of a direct connection of peripheral devices to the central processor unit.

SUMMARY OF THE INVENTION

The integrated and distributed input/output system of this invention permits a peripheral processor to be connected either directly to the central processor unit or to any one of the remote input/output controllers, while utilizing the same set of instructions stored in memory governing the input or output of data from the peripheral processor. The integrated and distributed input/output system of this invention includes an input/output bus connecting the central processor unit to a plurality of remote input/output controllers, each controller connected directly to a plurality of peripheral processors. These peripheral processors each control a peripheral device. In addition, a plurality of peripheral processors, each controlling a peripheral device, are connected directly to the central processor. Instructions are stored in memory which govern the input or output of data for a particular peripheral processor. The same software set is used in the input or output of data from this peripheral processor regardless of where the peripheral processor is connected within the system.

A peripheral processor adaptable to be used with this invention is disclosed in U.S. patent application Ser. No. 647,762, Filed Jan. 9, 1976, issued July 11, 1978 as U.S. Pat. No. 4,100,601 by Phillip A. Kaufman and Jerry R. Washburn, and assigned to the assignee of this application. The disclosure of that application is incorporated herein by reference. This peripheral processor itself contains firmware which is capable of outputting control information for accessing its particular input/output software set stored in the main memory. Once accessed, this software is used to control the input/output operations performed by the peripheral processor.

If the peripheral processor connects a peripheral device directly to the central processor unit, the central processor unit obtains the input/output sofeware address directly from firmware and uses this address to fetch the input/output software set from the main memory for performing the input/output operation with the peripheral processor. The term "software set" as used in this specification refers specifically to that portion of the computer's software for input/output operations which directly concerns data transfer.

If, instead, the particular peripheral processor is connected to a hardware input/output controller, the central processor unit will obtain the address of the input/output software set stored in memory from the hardware input/output controller unit. If, on the other hand, the peripheral processor is connected to an input/output controller having direct memory access capabilities, the input/output controller will itself interpret the software commands of the software set. Such a controller can effect the data transfer directly between the periheral processor and memory.

An advantage of the integrated and distributed input/output system of this invention is that peripheral devices having different data rates are more easily accommodated within the input/output system. Thus, peripheral devices which input or output data at rates which exceed the capability of the central processor unit may be connected to the remote input/output controllers having firmware which transfer data independently of the central processor unit. These high speed peripheral devices could then transfer data to memory without being constrained by the speed of the central processor unit. Peripheral devices having lower data rates could be connected to the hardware remote input/output controllers which utilize the central processor unit to transfer data from these peripheral devices. Finally, peripheral devices which have lower data rates may also be connected directly to the central processor unit, thereby increasing the input/output capability of the system.

An advantage afforded by this invention is an increase in the input/output capability of a computer without a corresponding increase in the software requirement for the computer. The single, most expensive item in today's computers is the preparation and maintenance of software. The increase in the input/output capability of a computer without a corresponding increase in the software costs presents a highly attractive low cost improvement, long sought in the art. Such an innovation makes applicant's computers particularly attractive to customers when compared with currently available computers sold by applicant's competitors.

The unique features of this invention are best understood through the following description of the preferred embodiment which references the following drawings.

DETAILED DESCRIPTION OF THE INVENTION

Overall Description of the Integrated Distributed Input/Output System

Figure 1:
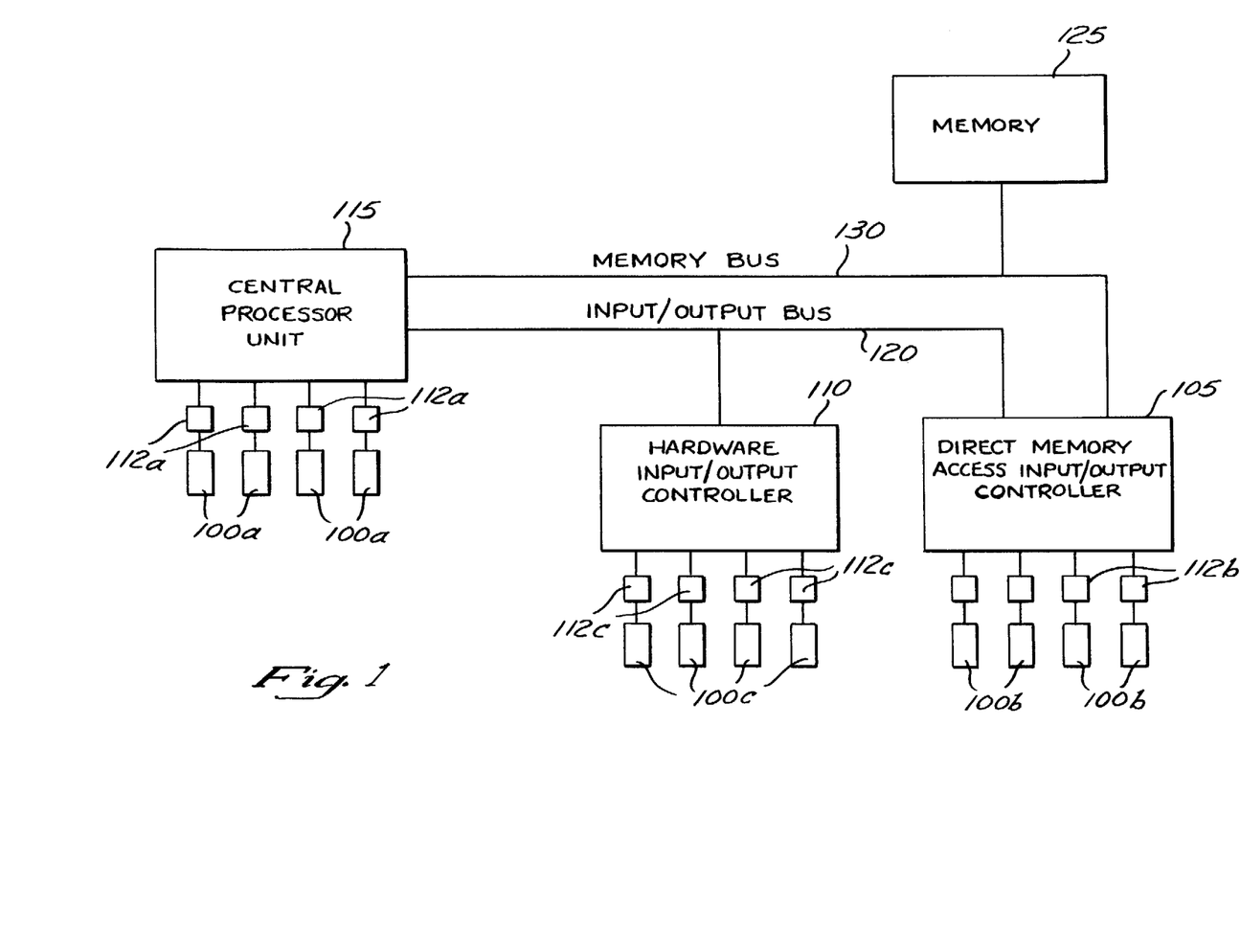
FIG. 1 is a simplified schematic diagram of the integrated and distributed input/output system of this invention.

Referring to FIG. 1, the present invention allows a plurality of peripheral devices 100a to be connected through peripheral processors 112a directly to a central processor 115, a plurality of peripheral devices 100b to be connected indirectly to the central processor 115 via a direct memory access input/output controller 105, and a plurality of peripheral devices 100c to be connected to the central processor unit 115 via a hardware input/output controller 110 not having a direct memory access. Both input/output controllers 105,110 are connected to the central processor unit 115 via an input/output bus 120. The central processor unit 115 is connected to a memory 125 via a memory bus 130. The direct memory access input/output controller 105 is also connected to the memory 125 via the memory bus 130. Each of the peripheral devices 100 operates in conjunction with a peripheral processor 112 which is uniquely designed to control the operations of the particular peripheral device and to interface this device with the remainder of the system.

It is generally desired in such systems, as shown in FIG. 1, to transfer data between the memory 125 and a particular peripheral device 100b. The central processor unit 115 controls the activation of such data transfers by sending to the appropriate peripheral device 100b a command message which causes the peripheral processor 112 to prepare the peripheral device for data transfer.

If the particular peripheral device 100b is connected to the direct memory access input/output controller 105, the central processor unit 115 will place this command message on the input/output bus 120. This message must contain the device address of the appropriate peripheral device 100b, which the direct memory access input/output controller 105 will recognize. The controller 105 will then pass this command message to the appropriate peripheral device 100b corresponding to the device address in the message.

Receipt of this command message by the peripheral device 100b results in the peripheral device 100b preparing itself for data transfer. The direct memory access input/output controller 105 uses the device address contained in the command message to deduce the address in the memory 125 where the input/output software set for handling the input/output operations of the peripheral device 100b are stored. The direct memory access input/output controller 105 then fetches and stores the input/output software set from the memory 125 using this address. In the meantime, the central processor unit 115 returns to other tasks, and does not concern itself with the input/output controller 105.

When the addressed peripheral device 100b senses the need for a data transfer, it sends a message through the peripheral processor 112b to the input/output controller 105. The input/output controller 105 contains within it firmware which controls the priority with which a particular peripheral device 100b will be serviced. Once the controller 105 selects the peripheral device which has been prepared for data transfer, the input/output software set fetched from memory 125 is executed by the controller 105. This results in data being transferred directly between the subject peripheral device 100b and the memory 125 via the memory bus 130.

If, on the other hand, the particular peripheral device 100c is connected to the hardware input/output controller 110 which does not have direct memory access, the central processor unit 115 will again place a command message on the input/output bus 120 containing the device address of the particular peripheral processor 112c. The input/output controller 110 will recognize the device address of the peripheral processor 112c which is attached to the controller 110, and will take the instruction from the input/output bus 120 and send it to the corresponding peripheral processor 112c. The peripheral device 100c will respond by preparing for a data transfer. The peripheral device 100c will subsequently sense a need for the data transfer, and will signal the input/output controller 110 of this need. The input/output controller 110 recognizes this signal on a priority basis established by hardware logic within the controller 110. Upon recognition of the signal from the peripheral device 100c, the input/output controller 110 places a request on the input/output bus 120 for the central processing unit 115 to interrupt its main line programming activities.

The central processing unit 115 recognizes this interrupt request based upon priority established by its hardware and firmware. Once the central processing unit 115 recognizes the interrupt request issued by the input/output controller 110, the central processing unit places on the input/output bus 120 a request for the address of the software set in memory for handling the input and output of data of the addressed peripheral device 100c. The input/output controller 110 responds to this request by placing on the input/output bus 120 an address which is furnished by the hardware logic of the input/output controller 110 based upon the device address of the addressed peripheral device 100c. The central processor unit 115, after receiving this address from the input/output controller 110 over the input/output bus 120, fetches the input/output software set from a location in memory 125 corresponding to the address furnished. The central processor unit 115 then executes this input/output instruction, and effects a transfer of data between the peripheral device 100c and a location in memory 125 determined by the input/output instruction.

If the particular peripheral device 100a is instead connected directly to the central processor unit 115, the central processor unit 115 will itself perform all of the functions performed in the preceding examples of data transfers. The same input/output software set will be fetched from the memory 125 by the central processing unit 115 based on information contained in the firmware of the peripheral processor 112 of the addressed peripheral device 100a.

One advantageous feature of the system illustrated in FIG. 1 is that a peripheral device 100 and its peripheral processor 112 may be connected at any one of the locations for the peripheral devices 100 illustrated in FIG. 1. Another advantageous feature of the system illustrated in FIG. 1 is that, when the system desires to transfer data with a particular peripheral device, the same input/output software set stored in the memory 125 will be utilized by the system, regardless of whether the particular peripheral device 100 is connected to the distributed memory access input/output controller 105, the input/output controller 110 without distributed memory access, or directly to the central processing unit 115.

DIRECT MEMORY ACCESS INPUT/OUTPUT CONTROLLER

Figure 2:
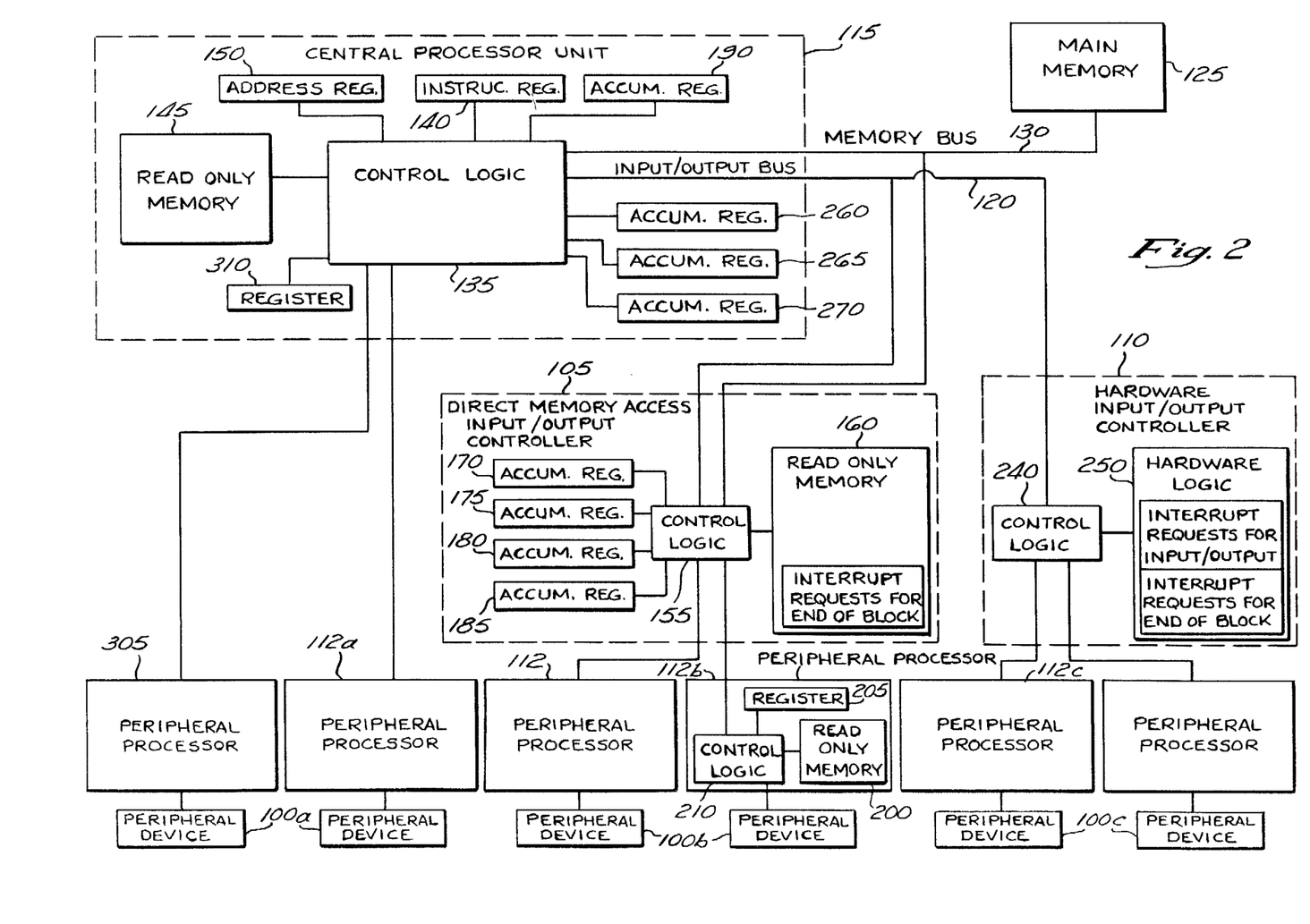
FIG. 2 is a schematic diagram of the input/output system of FIG. 1 showing greater detail.

FIG. 2 is a more detailed schematic diagram of the integrated and distributed input/output system of this invention, showing the location and connections of the various elements of the system.

Figure 3A:
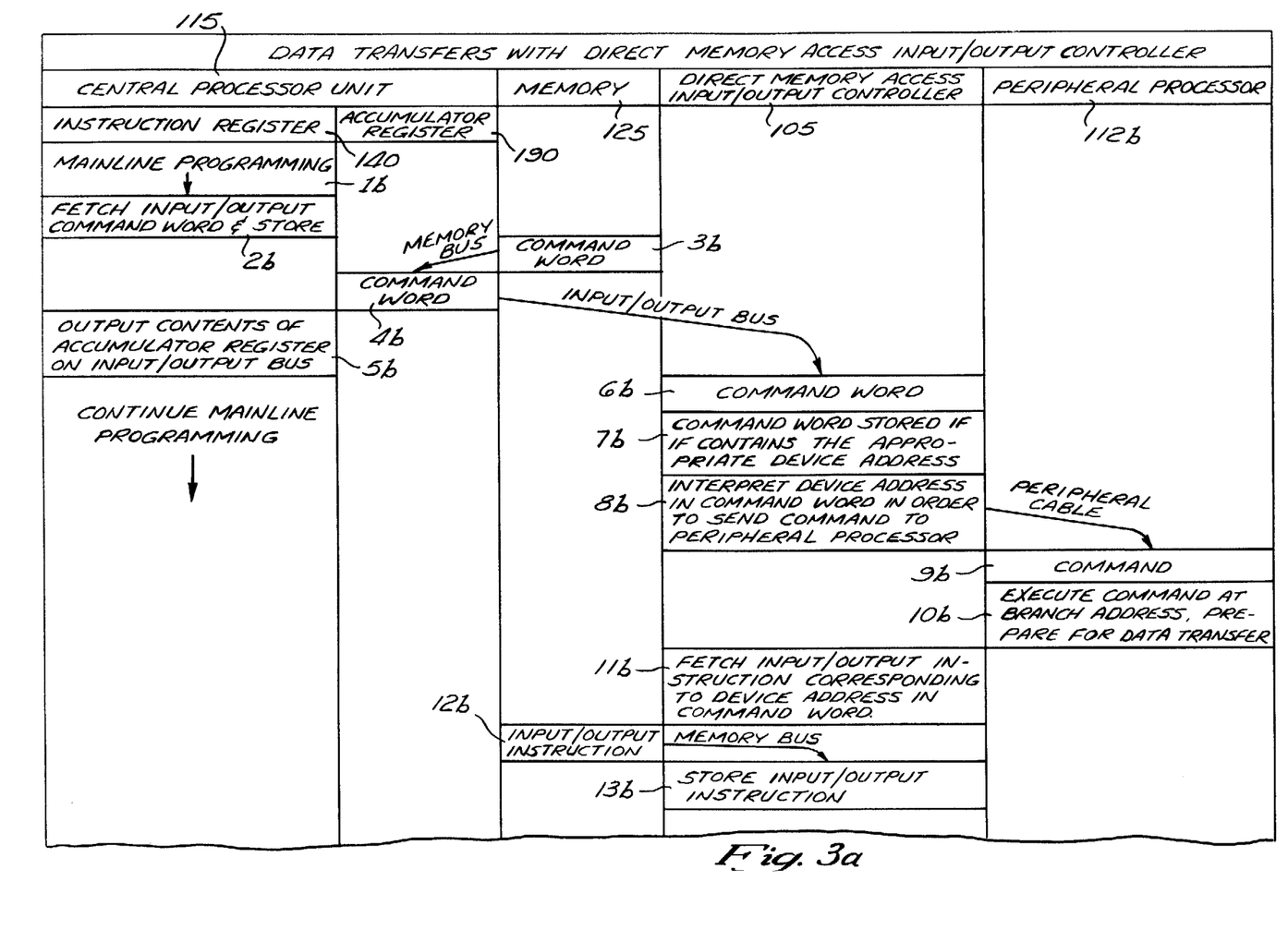
FIGS. 3a, 3b and 3c are a chart showing the firmware and hardware operations and data transfer routes of the input/output system of this invention with a direct memory access input/output controller.
Figure 3B:
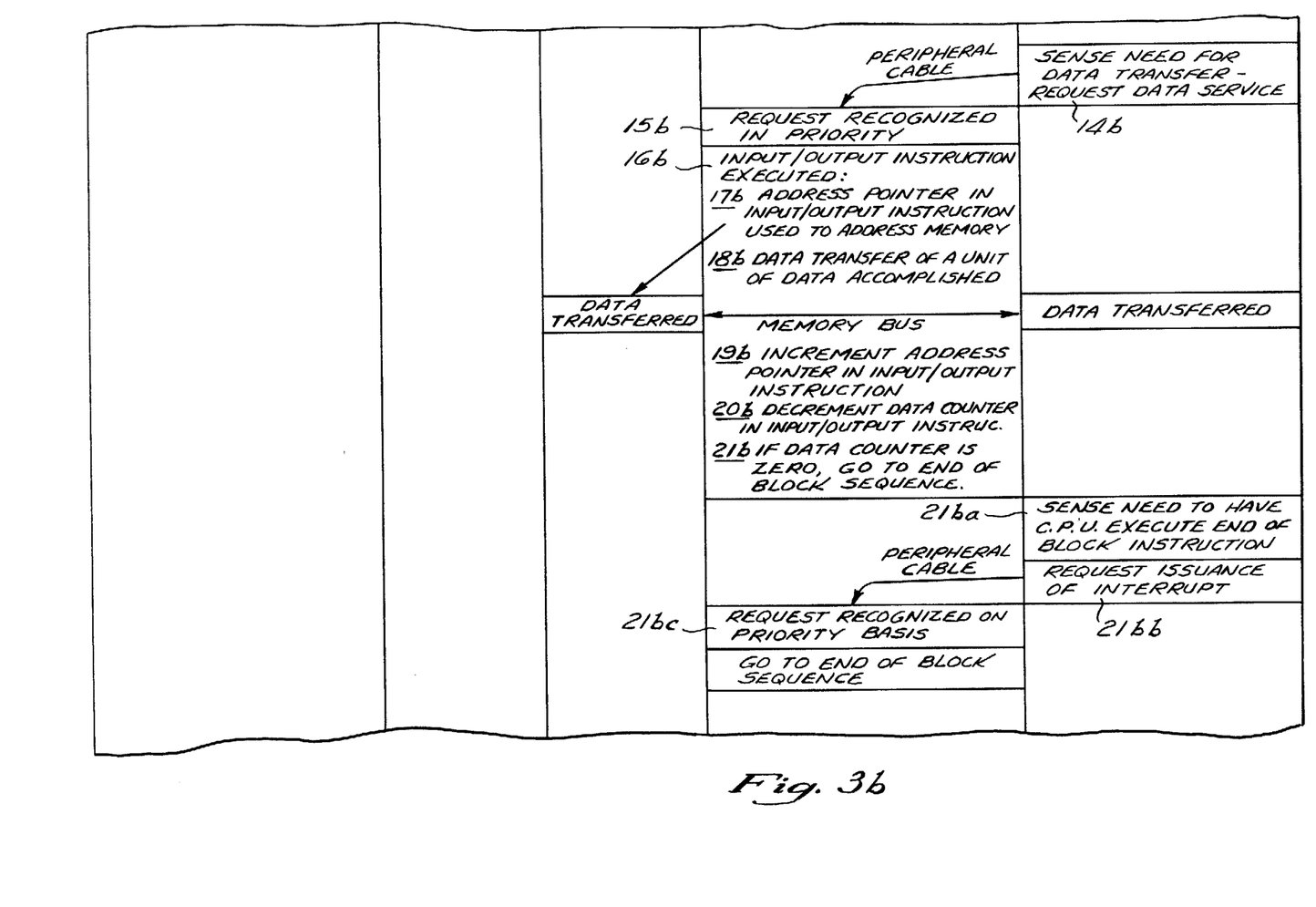
Figure 3C:
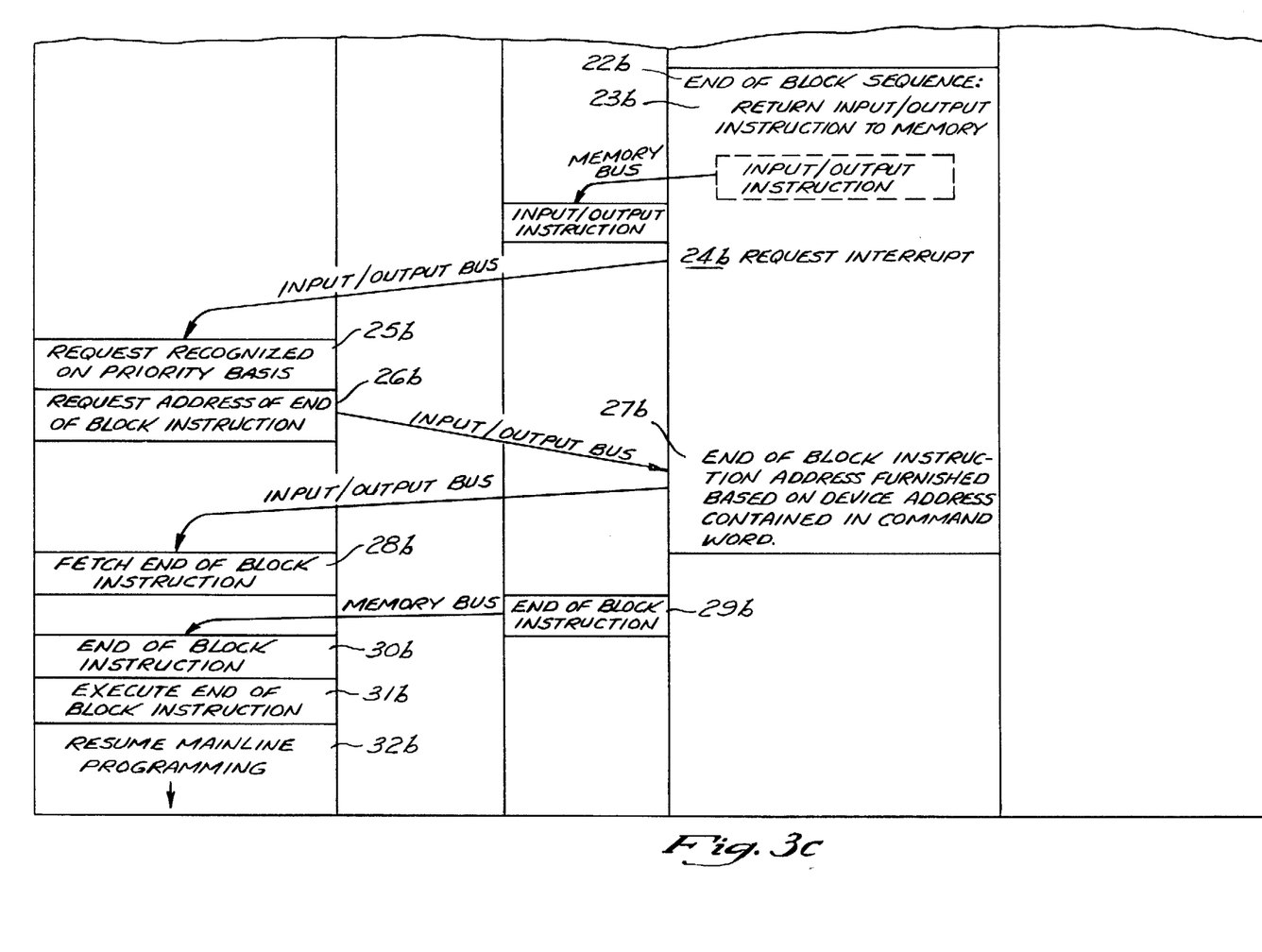

FIGS. 3a, 3b and 3c are a chart showing in chronological order the events occurring within the central processor unit 115, the memory 125, the direct memory access input/output controller 105, and the peripheral processor 112b. The events shown in FIG. 3 occur in connection with data transfers with the direct memory access input/output controller 105. The events occurring within the central processor unit 115 are divided into two columns entitled "Instruction Register 140" and "Accumulator Register 190". The events occurring within the memory 125 are shown in the column designated "Memory 125". The events occurring within the direct memory access input/output controller 105 are shown in the column designated "Direct Memory Access Input/Output Controller 105". Events occurring within the peripheral processor 112b are shown in the column designated "Peripheral Processor 112b". Each event occurs in chronological order starting at the top of each column. Thus, the first event, 1b, occurs within the instruction register 140 and is the main line programming activity. Event 2b is the execution of the instruction called "Fetch Input/Output Command Word and Store". Event 3b shows the command word stored in memory 125 being transferred via the memory bus 130 to be stored at Event 4b within the accumulator register 190. The remainder of the events is illustrated in similar fashion in descending order in the chart of FIGS. 3a, 3b, and 3c.

The central processor unit 115 includes control logic 135 which interprets software instructions stored in an instruction register 140 by the use of firmware stored in a firmware read-only-memory 145. These software instructions are fetched from an addressed location in the main memory 125 corresponding to an address contained in an address register 150 (FIG. 2), and these software instructions are placed in the instruction register 140. After the control logic 135 has interpreted and executed the software instruction in the instruction register 140 under the control of the firmware in the read-only-memory 145, the contents of the address register 150 are incremented or changed, and thus a new location in the memory 125 is addressed and another software instruction is fetched and loaded into the instruction register 140.

The direct memory access input/output controller 105 contains its own hardware control logic 155 and its own read-only-memory 160 which contains the firmware controlling the operation of the control logic 155.

In order to initiate input/output operations for a particular peripheral device 100b, the user's software (FIG. 3a, Event 2b) must cause a command word stored in main memory 125 to be sent (Event 3b) over the memory bus 130 to the central processor unit 115, and placed (Event 4b) in an accumulator register 190. The central processor unit 115 must then cause (Events 5b and 6b)

the contents of the accumulator register 190 to be placed on the input/output bus 120.

The command word contains the device address of the peripheral processor 112b with which a data transfer is to be effected. The command word also contains a branch address of a firmware instruction stored in a read-only-memory 200 of the peripheral processor 112b for the peripheral device 100b to prepare for a data transfer. Such an instruction may, for example, be to load a card if the peripheral device 100b is a card reader.

The control logic 155 of the controller 105 causes the command word to be stored (Event 7b) in a temporary storage register 170 in the controller 105. The control logic 155 uses firmware stored within the read-only-memory 160 to interpret the device address contained in the command word stored in the register 170. Then the control logic 155 sends (Event 9b) the branch address of the peripheral processor's firmware to the peripheral processor 112b designated by the device address. The peripheral processor 112b stores this branch address within a register 205. Control logic 210 of the peripheral processor 112b then executes (Event 10b) the instructions which are stored in the read-only-memory 200 at a location corresponding to the branch address contained in the register 205. Execution of these instructions causes the peripheral device 100b to prepare for a data transfer.

The control logic 155 of the input/output controller 105 uses the device address contained in the command word to obtain the address, stored within the read-only-memory 160, which designates the location in the main memory 125 of an instruction for transferring data with the peripheral processor 112b. The control logic 155 then directly fetches (Events 11b, 12b) the input/output software instruction from main memory at this address.

The input/output software instruction contains an address pointer specifying the location in main memory where the data transfer is to take place, a data counter corresponding to the number of data transfers that have occurred with the addressed peripheral processor 112b, and an operation code which specifies the type of data transfer to be performed. The control logic 155 stores (Event 13b) the address pointer in an AP register 175, the data counter in a DC register 180, and the operation code in an instruction register 185. The registers 175, 180, and 185 may be any accumulator registers in the direct memory access controller 105 which are available for temporary storage of the input/output instruction.

After a request for data service (Event 14b) from the peripheral processor 112b has been recognized (Event 15b), the control logic 155 executes (Event 16b) the instruction contained within the instruction register 185. This results in a direct transfer (Event 18b) on the memory bus 130 of a data unit between the peripheral processor 112b and a location in main memory addressed (Event 17b) by the contents of the AP register 175. The contents of the AP register 175 are then incremented (Event 19b), and the contents of the DC register 180 are then decremented (Event 20b). The input/output instruction is retained by the controller 105 for use with the next data transfer.

Firmware stored within the read-only-memory 160 causes the control logic 155 to test whether or not the contents of the DC register 180 is zero (Event 21b). If the contents of the register 180 are equal to zero, the control logic 155 enters an end of block sequence (Event 22b).

The need for an interrupt request may also be sensed independently by the peripheral processor 112b (Event 24ba). In such an event, the peripheral processor 112b signals the controller 105 to issue an interrupt request (Event 21bb). This signal is responded to by the controller 105 on a priority basis (Event 21bc). The control logic 155 then enters an end of block sequence (Event 22b).

In the end of block sequence (22b), the control logic 155 signals the peripheral processor 112b to suspend any further requests for data transfer and returns the input/output instruction to memory 125 (Event 23b). The control logic 155 then enters an interrupt request message on the input/output bus 120 requesting the central processor unit 115 to interrupt its main line programming activities (Event 24b).

The central processor unit will recognize a request for interrupt issued by the input/output controller 105 on a priority basis (Event 25b). Once the interrupt request is recognized by the control logic 135 of the central processor unit 115, the central processor unit 115 enters a request on the input/output bus 120 for an instruction address ( Event 26b). In response, the controller 105 furnishes to the central processor unit 115 an address stored in the read-only-memory 160 of the controller 105 (Event 27b). This address corresponds to the location in main memory 125 of an instruction to be executed by the central processor unit in order to permit the user's software to process a block of data. A block of data may, for example, be complete when the data counter 180 has been decremented to zero. This instruction is the end of block instruction. The control logic 135 of the central processor unit 115 then fetches the end of block instruction from main memory 125 (Events 28b, 29b, 30b). This instruction typically causes the contents of the address register 150 to be stored in main memory, and a new address to be loaded into the address register 150. This new address corresponds to the location in main memory 125 of the end of block subroutine. The end of block subroutine typically causes the control logic 135 to perform certain steps required by the user's software, depending upon the status of the peripheral processor 112b. This usually requires that the peripheral processor 112b be interrogated via the input/output bus 120, and that its status be transmitted via the input/output bus 120 to the central processor unit 115.

After the end of block instruction and subroutine have been executed (Event 31b), the central processor may return to main line programming and the entire cycle may be repeated (Event 32b).

The remote input/output controllers having direct memory access and firmware capability for managing the input/output operations from peripheral devices independently of the central processor unit are fully described in U.S. patent application Ser. No. 35,263, filed May 1, 1979, by Phillip Kaufman, Jerry R. Washburn, and Paul A. Stapinski, entitled "Distributed Input/Output Controller System", and assigned to the assignee of this application. The disclosure of that application is incorporated herein by reference.

HARDWARE REMOTE INPUT/OUTPUT CONTROLLER NOT HAVING DISTRIBUTED MEMORY ACCESS

Figure 4A:
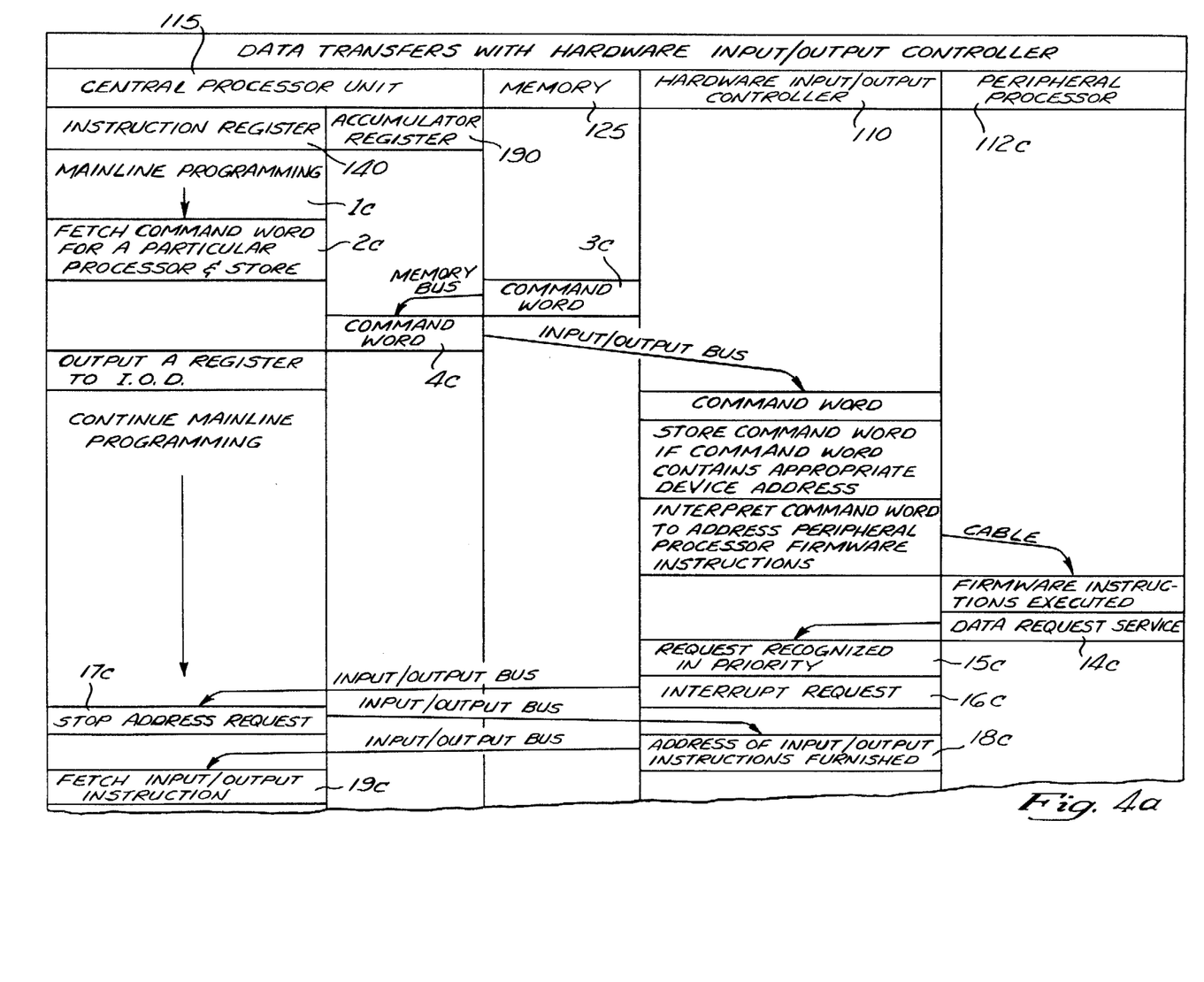
FIGS. 4a and 4b are a chart showing the hardware operations and data transfer routes of the input/output system of this invention with a hardware input/output controller.
Figure 4B:
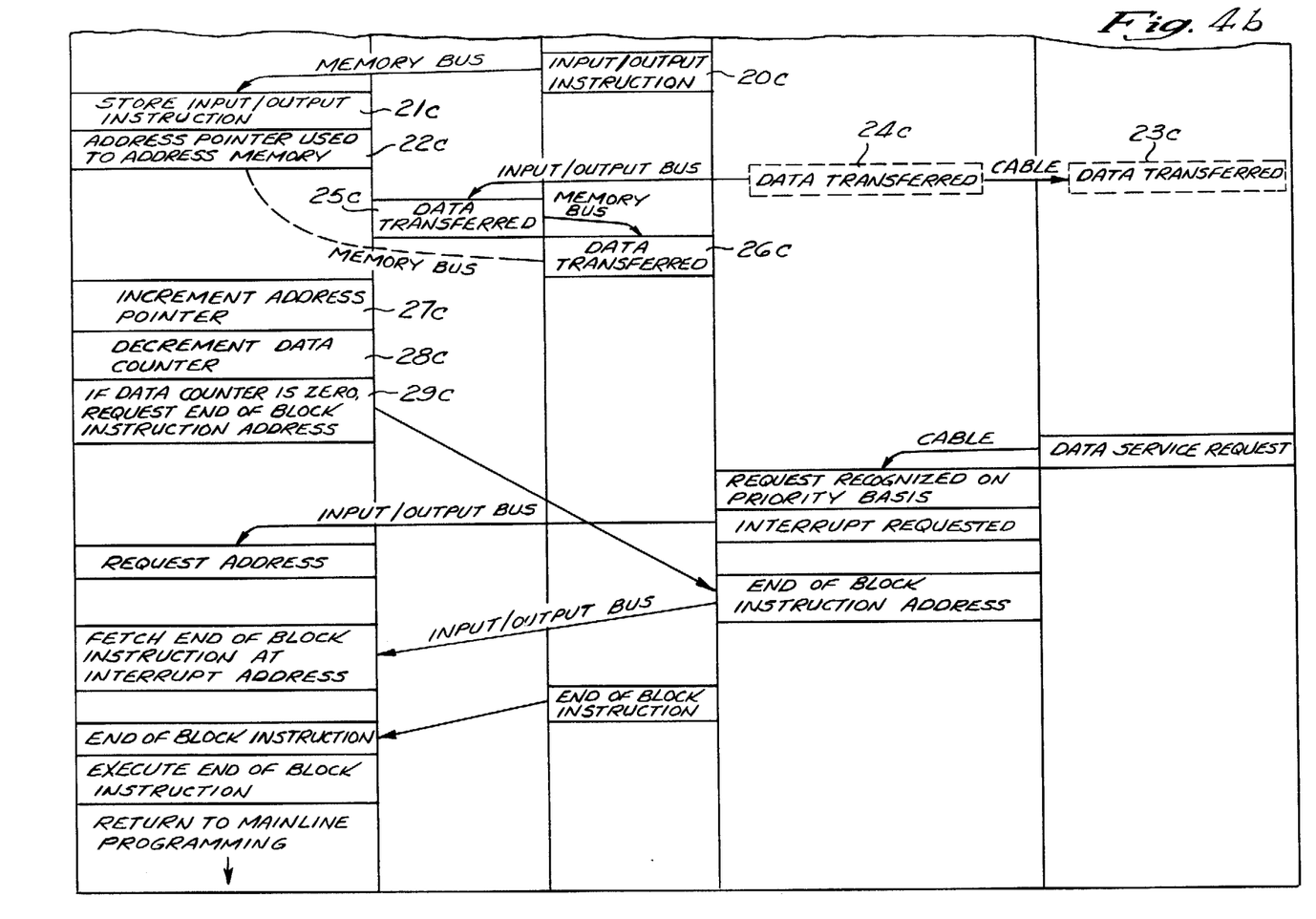

FIGS. 4a and 4b are a chart showing in chronological order the events occurring within the central processor unit 115, the memory 125, the hardware input/output controller 110, and the peripheral processor 112c. The events shown in FIGS. 4a and 4b occur in connection with data transfers with the hardware input/output controller 110. The events occurring within the central processor unit 115 are divided into two columns entitled "Instruction Register 140" and "Accumulator Register 190". The events occurring within the memory 125 are shown in the column designated "Memory 125". The events occurring within the hardware input/output controller 110 are shown in the column designated "Hardware Input/Output Controller 110". Events occurring within the peripheral processor 112c are shown in the column designated "Peripheral Processor 112c". Each event occurs in chronological order starting at the top of each column. Thus, the first event, 1c, occurring within the instruction register 140 is the main line programming activity. Event 2c is the execution of the instruction called "Fetch Input/Output Command Word and Store". Event 3c shows the command word stored in memory 125 being transferred via the memory bus 130 to be stored at Event 4c within the accumulator register 190. The remainder of the events is illustrated in similar fashion in descending order in the chart of FIGS. 4a and 4b.

Referring to FIG. 2, comparison of the hardware input/output controller 110 with the direct memory access input/output controller 105 shows that the hardware controller 110 lacks the read-only-memory 160 which the direct memory access controller 105 has. Instead, the hardware controller 110 has hardware logic 250 having less capability than the read-only-memory 160. Unlike the read-only-memory 160, the hardware logic 250 does not have the ability to store and execute an input/output instruction. Therefore, the hardware controller 110 has no AP register 175 and no DC register 180. Instead, data transfers done with the hardware controller 110 make use of an AP register 260, a DC register 265, and an instruction register 270 in the central processor unit 115. The register 260, 265, and 270 may be any accumulator registers in the central processor unit which are available for temporary storage of the input/output instruction. Furthermore, such data transfers are managed by the central processor 115 using firmware stored in its read-only-memory 145. Thus, the hardware controller 110 does not fetch an input/output instruction from memory 125. This is done instead by the central processor 115.

Comparison of FIGS. 4a and 4b with FIGS. 3a, 3b and 3c shows that the initiation of the peripheral processor firmware steps for preparation for data transfer by the issuance of an input/output command word is nearly identical with the procedure described in reference to FIGS. 3a, 3b and 3c for a direct memory access input/output controller, except that, as mentioned above, the central processor 115 fetches the input/output instruction. The operations in FIGS. 3a, 3b, and 3c do differ substantially from the operations shown in FIGS. 4a and 4b, however, following the issuance of a request for data service by the peripheral processor 112c (Event 14c). Referring to FIGS. 2 and 4a and 4b, the peripheral processor 112c issues a request for data service to a control logic unit 240 of the input/output controller 110 having no direct memory access (Event 14c). The request for data service is recognized by the control logic 240 on a priority basis established by a hardware logic unit 250 (Event 15c). The control logic 240, upon recognition of the request for data service of the peripheral processor 230, issues a request for interrupt on the input/output bus 120 (Event 16c). The central processor unit 115, and in particular its control logic 135, recognizes the request for interrupt on a priority basis. Systems for establishing priority basis for recognition of interrupt requests by the central processor are the subject of U.S. Patent Application Ser. No. 54,243, filed July 2, 1979 by Donald Coodrich, et al, entitled "Remote Distributed Interrupt Control For Computer Peripherals" and assigned to the assignee of this application. The disclosure of that application is incorporated herein by reference. After the control logic 135 of the central processor unit 115 has recognized the interrupt request issued by the controller 110, the control logic 135 interrupts its mainline programming activities and causes an address request to be issued on the input/output bus 120 (Event 17c). The controller 110 responds to this request for an address by placing on the input/output bus 120 the address of the location in main memory 125 of the input/output software instruction corresponding to the peripheral processor 112c (Event 18c). The hardware logic 250 of the controller 110 furnishes this address by deducing its location within the hardware logic 250 from the device address contained in the command word which had been issued previously to activate the peripheral processor 112c. The central processor unit 115 receives the address of the instruction word over the input/output bus 120, and uses this address to fetch the input/output instruction from the main memory 125 over the memory bus 130 (Events 19c, 20c). The input/output instruction is stored by the central processor unit 115 in three registers, an AP register 260, a DC register 265, and an instruction register 270 (Event 21c). The address pointer portion of the input/output instruction is stored in the AP register 260. The data counter portion of the input/output instruction is stored in the DC register 265. The operation code portion of the input/output instruction is stored in the instruction register 270. The contents of the instruction register 270 are then executed by the control logic 235. This results in a location in the memory 125 corresponding to the contents of the address pointer register 260 being accessed (Event 22c), and data being transferred by the control logic 135 between the peripheral processor 112c and the addressed location in the main memory 125 (Events 23c, 24c, 25c, 26c). The control logic 135 then increments the contents of the AP register 260 (Event 27c) and decrements the contents of the DC register 265 (Event 28c).

The control logic, acting under instructions stored in the read-only-memory 145, tests to see whether or not the contents of the DC register 265 are zero. If the contents of the DC register 265 are zero, the central processor unit 115 requests the hardware input/output controller 110 to furnish the address of the "end of block" instruction in the main memory 125 corresponding to the device address of the peripheral processor 112c (Event 29c). Meanwhile, at the completion of each data transfer, the control logic 135 returns the input/output instruction to memory 125, and will later have to fetch the instruction again for the next data transfer. This step is omitted from FIGS. 4a and 4b for the sake of simplicity and clarity.

Comparison of FIGS. 3a, 3b and 3c with FIGS. 4a and 4b shows that the initiation and execution of the "end of block" instruction is substantially identical with the initiation and execution of the end of block instruction described above in reference to FIGS. 3a, 3b, and 3c for direct memory access input/output controller data transfers.

The hardware remote input/output controller devices which permit the control of the input/output operations by the central processor unit are fully described in U.S. Patent Application Ser. No. 647,762, Filed Jan. 9, 1976, issued July 11, 1978 as U.S. Pat. No. 4,100,601 by Phillip A. Kaufman and Jerry R. Washburn, entitled "Multiplexer For A Distributed Input/Output Controller", and assigned to the assignee on the present invention. The disclosure of that application is incorporated herein by reference.

PERIPHERAL DEVICES CONNECTED DIRECTLY TO THE PROCESSOR UNIT

Figure 5A:
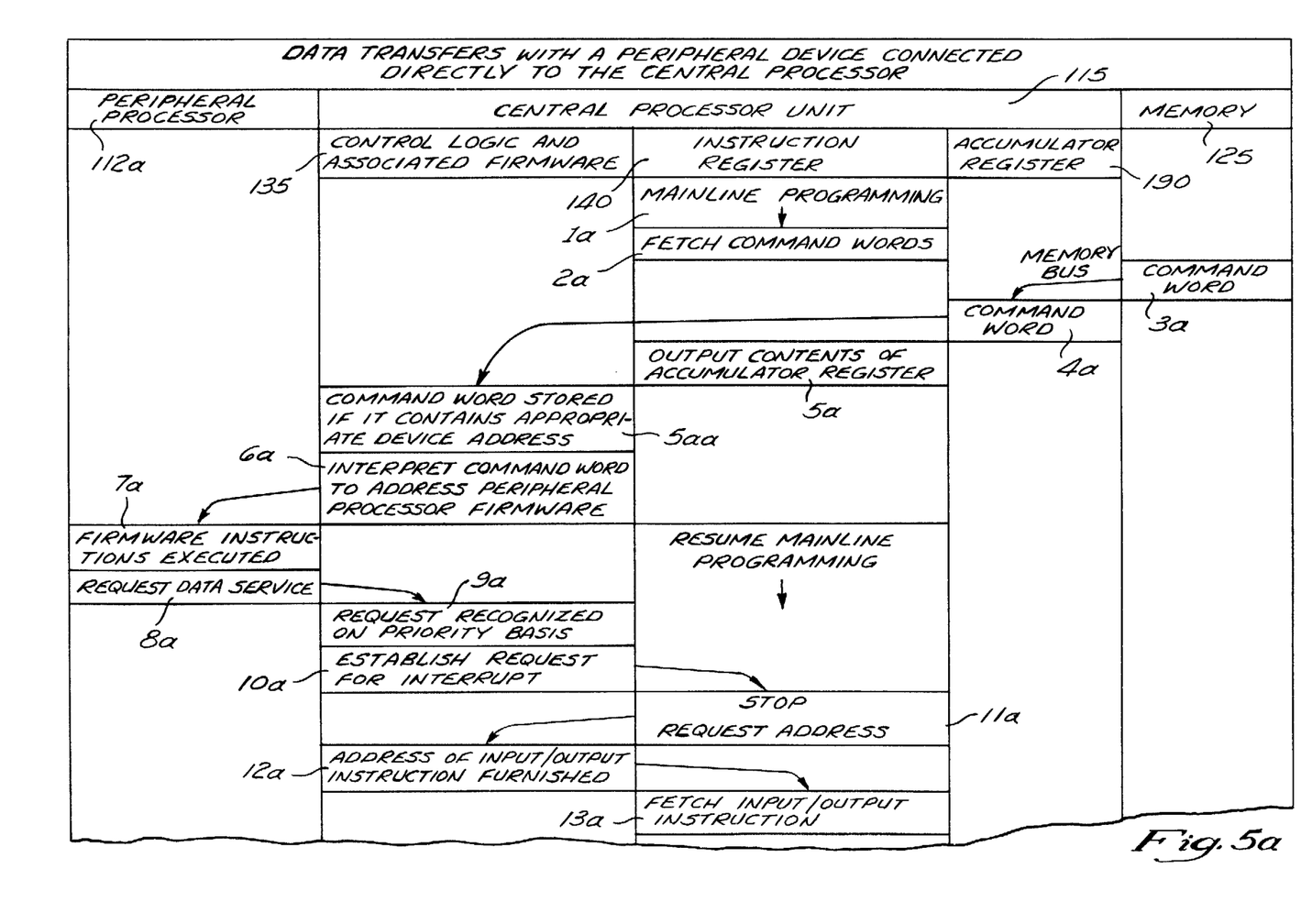
FIGS. 5a and 5b are a chart showing the firmware and hardware operations and data transfer routes of the input/output system of this invention with peripheral devices connected directly to the central processor unit.
Figure 5B:
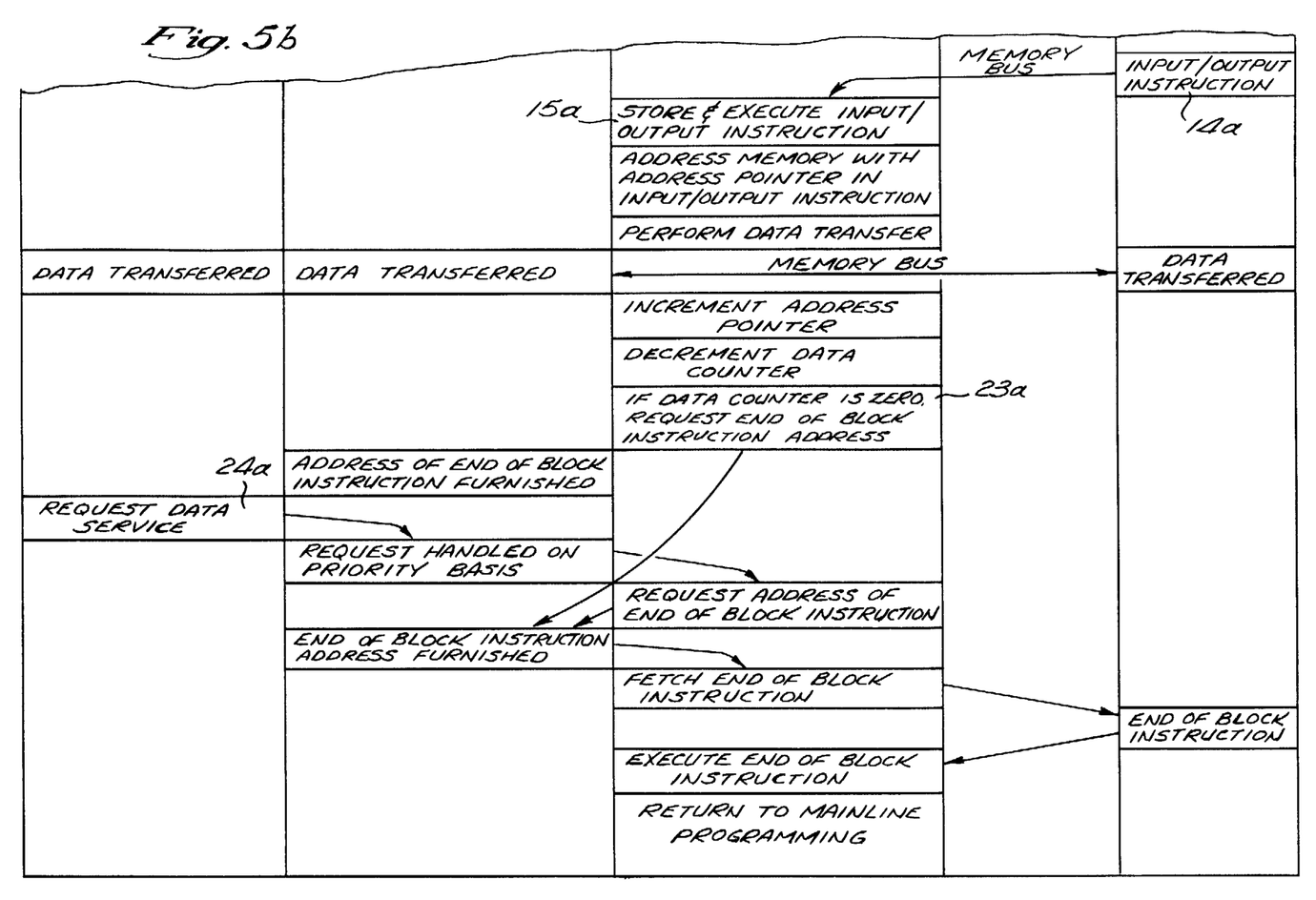

FIGS. 5a and 5b are a chart showing in chronological order the events occurring within the central processor unit 115, the memory 125, the control logic 135 with associated firmware in the read-only-memory 145, and the peripheral processor 112a. The events shown in FIGS. 5a and 5b are occur in connection with data transfers with peripheral processors 112a connected directly to the central processor 115. The events occurring within the central processor unit 115 are divided into three columns entitled "Instruction Register 140", "Accumulator Register 190" and "Control Logic 135 and Associated Firmware". The events occurring within the memory 125 are shown in the column designated "Memory 125". The events occurring within the control logic 135 and its associated firmware are shown in the column designated "Control Logic 135 and Associated Firmware". Events occurring within the peripheral processor 112a are shown in the column designated "Peripheral Processor 112a". Each event occurs in chronological order starting at the top of each column. Thus, the first event, 1a, occurs within the instruction register 140 and is the main line programming activity. Event 2a is the execution of the instruction called "Fetch Input/Output Command Word and Store". Event 3a shows the command word stored in memory 125 is transferred via the memory bus 130 to be stored at Event 4a within the accumulator register 190. The remainder of the events is illustrated in similar fashion in descending order in the chart of FIGS. 3a, 3b, and 3c.

Direct connection of the peripheral processor 112a to the control logic 135 of the central processing unit 115 requires no controller or multiplexer to be interposed between the peripheral processor 112a and the control logic 135. The functions otherwise performed by the input/output controllers 105, 110 are instead performed by the control logic 135 itself using special firmware stored in the read-only-memory 145. Thus, direct connection of the peripheral processors 112a to the control logic requires that some of the storage space in the read-only-memory 145 be used to store special firmware enabling the control logic 135 to interface with a plurality of peripheral processors 112a. This special firmware permits the user to connect peripheral processors 112a directly to the central processor 115 without having to purchase hardware such as a hardware input/output controller 105 or a direct memory access input/output controller 110.

The hardware participating in the transfer of data with a peripheral processor 112a is the memory bus 130, the control logic 135, the read-only-memory 145, the address register 150, the instruction register 140, the accumulator register 190, the AP register 260, the DC register 265, the instruction register 270, and a temporary storage register 310. The registers 260, 265, 270, and 310 may be any accumulator registers which are available for temporary storage of input/output instructions or command words. Comparison of FIGS. 5a and 5b with FIGS. 4a and 4b shows that the central processor unit 115 performs the same functions in the process illustrated in FIGS. 5a and 5b that the hardware input/output controller 110 performs in the process illustrated in FIGS. 4a and 4b. The control logic 135 executes special firmware instructions stored in the read-only-memory 145, performing the same steps performed by the hardware controller 110.

Referring to FIGS. 2, 5a, and 5b, the initiation of a data transfer with a peripheral processor 112a connected directly to the central processor unit 115 is begun when the contents of the instruction register 140 command the control logic 135 to fetch a command word having the device address of the peripheral processor 112a from main memory 125 via the memory bus 130 (Event 1a) as mentioned above. The control logic 135 causes the input/output command word to be loaded into the accumulator register 190 (Event 2a, 3a, 4a) as mentioned above. Since the device address contained in the command word is not that of a device connected along the input/output bus, the command word is not sent to the input/output bus. Instead, the contents of the accumulator register 190 are sent to the control logic 135 (Event 5a). The control logic 135 decodes the device address contained in the command word using special firmware stored in the read-only memory 145. Since the device address corresponds to the peripheral processor 112a connected to the central processor unit, the control logic 135 causes the command word to be stored in a register 310 (Event 5aa). The control logic 135, using the special firmware stored in the read-only-memory 145, decodes the contents of the register 310 to separate the branch address of instructions stored in read-only-memory of the peripheral processor 112a, and sends this branch address to the peripheral processor 112a (Event 6a). The peripheral processor 112a using this branch address, executes the instructions stored at this address in its read-only-memory firmware (Event 7a). This causes the peripheral device 100a attached to the peripheral processor 112a to prepare for a data transfer.

When the peripheral processor 112a senses the need for a data transfer, it requests the control logic 135 to establish an interrupt request (Event 8a). This request is implemented by the control logic 135 on a priority basis determined by firmware stored in the read-only-memory 145 (Event 9a). The control logic 135 then establishes a request to interrupt main line programming (Event 10a). This request for interrupt is also handled on a priority basis by the control logic 135. In response to the request for interrupt, the control logic 135 establishes a request for an address (Event 11a). The control logic 135 then utilizes firmware stored in the read-only-memory 145 to decode the device address in the command word stored in the register 310 to determine the address to be supplied (Event 11a). This address is likewise stored in the read-only-memory 145 and corresponds to the location in main memory of the input/output instruction for effecting a data transfer with the peripheral processor 112a. Upon acquiring this address, the control logic 135 fetches the input/output instruction from main memory, stores it in the registers 260, 265, 270, and executes the instruction (Events 13a, 14a, 15a). Performance of the input/output function is substantially identical to the manner described in the preceding section on data transfers with the hardware input/output controller 110.

However, the central processor unit 115 must use a different set of firmware instructions stored in the read-only-memory 145 when the data transfer is done through the hardware controller 110.

At the completion of each data transfer, the control logic 135 returns the input/output instruction to memory 125 via the memory bus 130 and will later have to fetch the instruction again for the next data transfer. This step is omitted from FIGS. 5a and 5b for the sake of simplicity and clarity. The control logic 135 will establish a request for interrupt if the data counter portion of the input/output instruction stored in the DC register 265 is zero (Event 23a). The peripheral processor 112a may independently sense a requirement for an interrupt, and will independently signal the control logic 135 to establish a request for interrupt (Event 24a). The handling by the control logic 135 of the interrupt request which results in the execution of the end of block instruction is nearly identical to the manner in which the control logic 135 handles the interrupt request for end of block instructions issued by the hardware input/output controller 110, which has been previously described.

SUMMARY OF OPERATION OF THE INTEGRATED AND DISTRIBUTED INPUT/OUTPUT SYSTEM

Each of the input/output controllers of this invention, including the central processor 115, the direct memory access input/output controller 105, and the hardware input/output controller 110 are capable of connecting and interfacing the same peripheral processor 112. Furthermore, the same input/output software instruction stored in main memory 125 is utilized to manage the transfer of data with a peripheral processor attached to any one of the controllers 105, 110, or to the central processor 115.

This invention allows issuance of the same input/output command word and the use of the same input/output instruction, both stored in memory 125, to accomplish data transfers with a peripheral device 100 having a device address corresponding to the device address contained within the command word, regardless of where the peripheral device 100 is connected within the system.

The hardware controller 110 uses its hardware logic 250 to furnish the address in memory 125 of the input/output instruction corresponding to the peripheral device 100 addressed by the command word. The direct memory access controller 105 uses its read-only-memory 160 to furnish the address in memory 125 of the input/output instruction corresponding to the peripheral device 100 addressed by the command word. Finally, the central processor 115 uses its read-only-memory 145 to furnish the address in memory 125 of the input/output instruction corresponding to the peripheral processor 100 addressed by the command word.

The central processor unit 115 controls the transfer of data between main memory 125 and the peripheral processor 112 connected either directly to the central processor 115 or to the hardware input/output controller 110. Whereas the hardware input/output controller 110 requires the storage of instructions in expensive hardware logic 250, direct connection of the peripheral processor 112a to the central processor 115 makes use of firmware stored in the read-only-memory 145 of the central processor unit 115, and therefore requires substantially no extra hardware. Thus, it is seen that the direct connection of peripheral processors 112a to the central processor 115 is inexpensive in comparison with the cost of a hardware input/output controller 110.

The purchaser of the central processor unit 115 of this invention acquires, with the central processor unit 115, input/output capabilities at a low cost because of the relatively inexpensive implementation of direct connection of peripheral processors 112a to the central processor 115. The purchaser also has the option of later adding the more expensive hardware input/output controller 110 or the direct memory access input/output controller 105 on an input/output bus 120. The purchaser may exercise this option of adding the remote input/output controllers without adding to or changing any of the input/output software instructions already contained in the main memory 125.

As described before, this invention permits better adaptation to a group of peripheral devices 100 having various data rates. Thus, high speed peripheral devices having data rates in excess of the capabilities of the central processor unit can be connected to the direct memory access input/output controller 105. This would allow the high speed peripheral device 100 to transfer data directly to or from the memory 125 at a high data rate independently of the relatively low data rate of the central processor unit 115. Peripheral devices 100 having lower data rates could be connected either to the hardware controller 110 or directly to the central processor 115, affording a greater number of locations for the connection of peripheral devices 100 compared with systems which do not afford direct connection of peripheral devices to the central processor.

What is claimed is:

1. A computer system comprising:
   a computer including a central processor and a memory;
   a first plurality of peripheral devices;
   controller means connected to said computer and to said first plurality of peripheral devices for selecting and prioritizing data transfers with said first plurality of peripheral devices in accordance with instructions stored in said memory and a command from said central processor; and
   a second plurality of peripheral devices connected to said central processor, said central processor selecting and prioritizing data transfers with said second plurality of peripheral devices in accordance with instructions stored in said memory.

2. A computer system comprising:
   a memory;
   a central processor;
   a first plurality of peripheral devices connected to said processor;
   a controller;
   a second plurality of peripheral devices connected to said controller;
   a first means in said central processor and connected to said first plurality of peripheral devices and said memory for selecting and prioritizing data transfers with said first plurality of peripheral devices in accordance with instructions stored in said memory; and
   a second means in said controller and connected to said memory for selecting and prioritizing data transfers in accordance with said instructions and a command from said central processor.

3. A computer system comprising:
a memory;
a central processor connected to said memory;
a first plurality of peripheral devices connected to said processor;
a controller;
a second plurality of peripheral devices connected to said controller;
a first means in said central processor and connected to said first plurality of peripheral devices for selecting and prioritizing data transfers with said first plurality of peripheral devices;
a second means in said controller and connected to said memory for selecting and prioritizing data transfers with said second plurality of peripheral devices;
an instruction data word stored in said memory defining the sequencing and routing of data transfers between said central processor and said first plurality of pierpheral devices; and
means within said controller utilizing said instruction data word for routing and sequencing data transfers with one of said second plurality of peripheral devices in accordance with a command from said central processor.

4. A computer system as defined in claim 3 wherein said utilizing means comprises:
an address data word stored in said controller;
means furnishing said address data word to said processor; and
means in said processor responsive to said address data word for accessing said instruction data word.

5. A computer system as defined in claim 3 wherein said utilizing means comprises:
an address data word stored in said controller;
means furnishing said address data word to said controller; and
means in said controller responsive to said address data word for accessing said instruction data word.

6. A computer system as defined in claim 5 wherein said controller further comprises:
means for fetching and executing said instruction data word; and
means bypassing said processor for transferring data between said peripheral device and said memory.

7. A computer system as defined in claim 6 wherein:
one of said second plurality of peripheral devices has a data rate greater than the data rate of said central processor unit, whereby data is transferred between said one of said second plurality and said memory at a rate equal to said greater data rate.

8. A computer system comprising:
a memory;
a central processor connected to said memory;
a first plurality of peripheral devices connected to said processor;
a controller;
a second plurality of peripheral devices connected to said controller;
a first means in said central processor and connected to said first plurality of peripheral devices for selecting and prioritizing data transfers with said first plurality of peripheral devices;
a second means in said controller and connected to said memory for selecting and prioritizing data transfers with said second plurality of peripheral devices in accordance with a command from said central processor;
an instruction data word stored in said memory defining the sequencing and routing of data transfers between said central processor and said first plurality of peripheral devices; and
wherein any one of said first plurality of peripheral devices is interchangeable with any one of said second plurality of peripheral devices.

9. A computer system comprising:
a memory;
a central processor comprising:
a first selection and prioritizing means;
a controller connected to said central processing unit and comprising:
a second selection and prioritizing means communicating with said memory independently of said central processor in accordance with a command from said central processor;
a first peripheral device connected to said first selection and prioritizing means; and
at least two second peripheral devices connected to said second selection and prioritizing means.

10. A computer system comprising:
a central processor comprising:
a first selection and prioritizing means;
a controller connected to said central processor and comprising:
a second selection and prioritizing means;
a first peripheral device connected to said first selection and prioritizing means;
at least two second peripheral devices connected to said second selection and prioritizing means so that data transfers between said two second peripheral devices occur in accordance with a command from said central processor;
a first memory connected to said central processor;
a data instruction word stored in said first memory defining the routing and sequencing of data transfers between said first memory and said first and second peripheral devices; and
first means in said processor for accessing said data instruction word for data transfers with said first peripheral device.

11. A computer system as defined in claim 10 further comprising:
second means in said controller for accessing said data instruction word for data transfers with said second peripheral devices.

12. A computer system as defined in claim 11 wherein said first peripheral device is interchangeable with said second peripheral devices.

13. A computer system as defined in claim 11 wherein said second accessing means comprises:
a third memory in said controller;
second control logic hardware in said controller; and
a plurality of address data bits stored in said third memory executed by said second control logic hardware for fetching said instruction data word stored in said first memory.

14. A computer system as defined in claim 10 wherein said accessing means comprises:
a second memory in said processor;
first control logic hardware in said processor; and
a plurality of address data bits stored in said second memory executed by said first control logic hardware for fetching said instruction data word stored in said first memory.

15. In a computer comprising a processor, a first input/output controller means, a peripheral device interchangeably connectable first to said processor or second to said first controller means, a memory, a universal input/output instruction data word stored in said memory for data transfers with said peripheral device, a method of transferring data with said peripheral device comprising:

sensing the first or second interchangeable connection of said peripheral device; and selectively performing Steps A or B below in response to said sensing step:

A. sending said data word to said first controller means in response to said sensing step if said device is connected to said first controller means, and interpreting and executing said data word in said first controller means;

B. sending said data word to said processor in response to said sensing step if said device is connected to said processor, and interpreting and executing said data word in said processor.

16. A method of transferring data with a peripheral device as defined in claim 15 wherein said computer further comprises a second controller means, said peripheral device interchangeably connectable third with said second controller means, said sensing step further comprising sensing the first, second, or third interchangeable connection of said peripheral device, said performing step includes selectively performing Steps A, B, or C in response to said sensing step, wherein Step C comprises:

C. sending said data word to said second controller means in response to said sensing step if said device is connected to said second controller means, and interpreting and executing said data word in said second controller means.

* * * * *